United States Patent
Negishi et al.

(10) Patent No.: US 7,781,369 B2
(45) Date of Patent: Aug. 24, 2010

(54) MESOPOROUS SILICA THICK-FILM, PROCESS FOR PRODUCING THE SAME, ADSORPTION APPARATUS AND ADSORBING FILM

(75) Inventors: Hideyuki Negishi, Ibaraki (JP); Akira Endo, Ibaraki (JP); Masaru Nakaiwa, Ibaraki (JP); Hiroshi Yanagishita, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 11/918,894

(22) PCT Filed: Apr. 20, 2006

(86) PCT No.: PCT/JP2006/308336

§ 371 (c)(1),
(2), (4) Date: Oct. 19, 2007

(87) PCT Pub. No.: WO2006/112505

PCT Pub. Date: Oct. 26, 2006

(65) Prior Publication Data

US 2009/0082201 A1   Mar. 26, 2009

(30) Foreign Application Priority Data

Apr. 20, 2005 (JP) .............................. 2005-122591

(51) Int. Cl.
*B01J 20/10* (2006.01)
*C01B 33/12* (2006.01)
(52) U.S. Cl. ..................... 502/407; 502/405; 423/335
(58) Field of Classification Search ............... 502/407, 502/405; 423/335
See application file for complete search history.

(56) References Cited

U.S. PATENT DOCUMENTS

| 5,951,962 | A | * | 9/1999 | Muller et al. | ............... 423/702 |
| 6,592,764 | B1 | | 7/2003 | Stucky et al. | |
| 2004/0118698 | A1 | * | 6/2004 | Lu et al. | ..................... 205/224 |
| 2005/0025690 | A1 | * | 2/2005 | Fukuda et al. | .............. 423/335 |

FOREIGN PATENT DOCUMENTS

EP   0 739 856   10/1996

(Continued)

OTHER PUBLICATIONS

Ryoo et al., "Optically Transparent, Single-Crystal-Like Oriented Mesoporous Silica Films and Plates," J. Phys. Chem. B (1997) 101, 10610-10613.*

(Continued)

*Primary Examiner*—Timothy C Vanoy
*Assistant Examiner*—Daniel Berns
(74) *Attorney, Agent, or Firm*—Morgan, Lewis & Bockius LLP

(57) ABSTRACT

A mesoporous silica thick-film comprising a layer of mesoporous silica formed in a thickness of 10 μm to 1 mm, and a process for producing a mesoporous silica thick-film, which comprises disposing a substrate in a solution containing mesoporous silica suspended therein and subsequently applying a voltage thereby to form a film having a thickness of 10 μm to 1 mm by the electrophoretic deposition of the mesoporous silica on a surface of the substrate is provided.

20 Claims, 13 Drawing Sheets

FOREIGN PATENT DOCUMENTS

| | | |
|---|---|---|
| JP | 9-194298 | 7/1997 |
| JP | 2002-250713 | 9/2002 |
| JP | 2002-338229 | 11/2002 |
| JP | 2003-531083 | 10/2003 |
| JP | 2003-335516 | 11/2003 |
| JP | 2004-27270 | 1/2004 |
| JP | 2004-345895 | 12/2004 |
| JP | 2005-162596 | 6/2005 |
| WO | WO-91/11390 | 8/1991 |

OTHER PUBLICATIONS

Nishimori et al., "Influence of Size of Dispersed Silica Particles on Preparation of Thick Silica Films by Using Electrophoretic Sol-Gel Deposition," Bull. Chem. Soc. Jpn. (1996) 69, 815-818.*

C.T. Kresge et al., "Ordered Mesoporous Molecular Sieves Synthesized by a Liquid-Crystal Template Mechanism," *Nature*, Oct. 22, 1992, vol. 359, pp. 710-712.

S. Inagaki et al., "Synthesis of Highly Ordered Mesoporous Materials From a Layered Polysilicate," *Journal of the Chemical Society, Chemical Communications*, 1993, pp. 680-682.

J.S. Beck et al., "A New Family of Mesoporous Molecular Sieves Prepared with Liquid Crystal Templates," *Journal of the American Chemical Society*, 1992, vol. 114, pp. 10834-10843.

Makoto Ogawa, "A Simple Sol-Gel Route for the Preparation of Silica-Surfactant Mesostructured Materials," *Chemical Communications*, 1996, pp. 1149-1150.

Yufeng Lu et al., "Continuous Formation of Supported Cubic and Hexagonal Mesoporous Films by Sol-Gel Dip-Coating," *Nature*, Sep. 25, 1997, vol. 389, pp. 364-368.

Hong Yang et al., "Synthesis of Oriented Films of Mesoporous Silica on Mica," *Nature*, Feb. 22, 1996, vol. 379, pp. 703-705.

Masaharu Nakayama et al., "Denki Eidoho ni yoru Mesoporous Silica Biryushimaku Denkyoku no Sakusei to Denki Kagakyteki Tokusei (Fabrication of Film Electrode Coated with Mesoporous Silica Fine Particles by Electrophoretic Method, and the Electrochemical Properties)," The Electrochemical Society of Japan Taikai Koen Yoshishu, Mar. 28, 2000, vol. 67, p. 257.

* cited by examiner

US 7,781,369 B2

MESOPOROUS SILICA THICK-FILM, PROCESS FOR PRODUCING THE SAME, ADSORPTION APPARATUS AND ADSORBING FILM

TECHNICAL FIELD

The present invention relates to a mesoporous silica thick-film, a process for producing the same, an adsorption apparatus, and an adsorbing film.

BACKGROUND ART

Porous materials have been utilized in various fields such as adsorption and separation. According to IUPAC, porous materials are classified into microporous ones having a fine pore diameter of 2 nm or less, mesoporous ones having a fine pore diameter of 2 to 50 nm, and macroporous ones having a fine pore diameter of 50 nm or more. The microporous porous materials have conventionally been known and zeolites such as natural aluminosilicate salts and synthetic aluminosilicate salts, metal phosphate salts, and the like are known. They have been utilized for selective adsorption and form-selective catalytic reactions, and as molecular-size reaction vessels, in which the fine pore size of the fine pores is utilized.

As the mesoporous one, attention is attracted to mesoporous silica having a homogeneous pores with narrow pore size distribution in nanometer level are regularly arranged. It has a structure where the pores having an equal diameter are arranged in a honeycomb form. In comparison with the conventional porous materials such as zeolite, it has characteristics that the fine pore volume is large and the surface area is also large. Silica gel has a disordered porous structure and silica gel having such a high specific surface area and such a large pore volume has not been known.

In both cases, it is deemed that structural control of silica is achieved through an action of a surfactant aggregate as a template. These substances are not only very useful materials as catalysts for bulky molecules which do not enter the pores of zeolite, but also may be applied to functional materials such as optical materials and electronic materials by introducing guest species having various functions into the fine pores.

The mesoporous silica is specifically known as a material called MCM-41 synthesized by hydrolyzing alkoxides of silicon in the presence of a surfactant as described in Non-Patent Document 1 and a material called FSM-16 synthesized by intercalating an alkylammonium between layers of kanemite, which is one type of layered silicic acid, as described in Non-Patent Document 2.

Utilizing self-assembling of an organic compound and an inorganic compound, a porous substance having homogenous mesopores is produced. As the production process, for example, it is produced by hyrdothermal synthesis in a heat-resistant vessel in which silica gel and a surfactant are enclosed under tight sealing as described in Patent Document 1. Moreover, Non-Patent Document 2 describes a production process wherein it is produced by ion-exchange of kanemite, which is one type of layered silicate salts with a surfactant. Non-Patent Document 4 describes a process for producing an inorganic porous body by forming a three-dimensional highly regular composite of inorganic material-surfactant as a precipitate through hydrothermal synthesis using an aggregate of a surfactant consisting of an alkyltrimethylammonium as a template, subjecting the composite to solid-liquid separation and washing, and then removing organic substances contained therein through calcination. The concentration of the surfactant is determined to be a concentration higher than the critical micelle concentration and lower than the liquid crystalline phase-forming concentration, e.g., 25 wt % and the pH of the solution is from 10 to 13. Furthermore, standard reaction temperature is 100° C. or higher and reaction time is 2 days or more, and thus, it is synthesized using an autoclave. The porous body obtained by the hydrothermal synthesis has remarkably homogenous mesopore diameter as compared with the conventional porous materials and has a characteristic structure where the fine pores are regularly arranged.

In the case where such mesoporous porous bodies having a regular fine pore structure is applied to functional material fields other than catalysts, it is important to uniformly hold these materials on a substrate. As processes for producing a homogeneous mesoporous thin-film on a substrate, there may be mentioned a process by spin-coating as described in Non-Patent Document 4, a process by dip-coating as described in Non-Patent Document 5, a process of precipitating a film on a solid surface as described in Non-Patent Document 6, and the like. The thickness of the thin film provided on the substrate is usually about several micrometers.

There are known a silica mesostructure thin film formed on a polymer compound film provided on a substrate wherein the thin film is formed on part or all of the polymer compound film having structural anisotropy imparted on the surface by linear polarized light irradiation (Patent Document 2) and a method of maintaining alkaline pH in an aqueous solution containing a surfactant and heating the whole to remove the surfactant (Patent Document 3). A method by spin coating (Patent Document 4) and the like are known.

The mesoporous silica of the porous material has a characteristic that it has a regular arrangement such as lamella, hexagonal, or cubic one or, even when it has no regular arrangement, has homogeneous mesopores. Since it has a large pore volume and a large number of hydroxyl groups are present on the surface of the fine pore wall, absorbed amount of water is large. Thus, use as a water absorbent has been developed and applications to an absorbent for separation, a sensor, a support for catalysts, and a fuel cell have been investigated, as well as studies for producing a film thereof have been performed.

It has been found that the film has an excellent gas adsorbing property and also has a function of separating various substances. Therefore, a variety of processes for producing such a porous body having a void structure have been proposed.

Moreover, there are a number of reports as the other production processes. For example, as a process for producing mesoporous silica at normal temperature for a short period of time, a synthetic process using a vacuum evaporator or the like devised by Dr. Endo, researcher of National Institute of Advanced Industrial Science and Technology is described in Patent Document 5. The process possesses advantages that rapid synthesis is possible at low temperature as compared with the hydrothermal synthesis and operation is simple and cost-performance is excellent since a solid-liquid separating step and a washing step are unnecessary. Furthermore, the resulting porous material also possesses an advantage of high steam resistance.

The aforementioned mesoporous silica is expected as an adsorbent for water and organic vapors based on its uniform and regular fine pore structure. For example, in the case where it is considered as a water vapor adsorbent, since it exhibits a large adsorption and desorption amount in a specific narrow relative humidity range depending on a pore diameter and the adsorption is attributable to capillary condensation, it has a large potential as a novel adsorbent (moisture adsorbent)

which requires small energy for regeneration, requires low temperature for regeneration, and has a large adsorption amount. Such adsorption properties are excellent properties which are not exhibited by conventionally often employed zeolites and silica gel.

At the time when an adsorbent is applied to an actual adsorption system (e.g., desiccant air conditioning), it is necessary to fix an adsorbent on a suitable substrate. The most common one is a honeycomb rotor and usually, a ceramic paper or the like is used. For supporting an adsorbent on the honeycomb rotor, it is necessary to carry out steps of dispersing the adsorbent into a solution to form a slurry with a binder, impregnating a parent material of the honeycomb rotor therewith, and then drying and calcining the same. Moreover, in the case where the adsorbent is used as an adsorbent for an adsorbtion heat pump, it is considered that it is desirable to fix the adsorbent on a metal fin from the viewpoint of improving heat-transfer properties.

Specifically, there is a known process for producing a mesoporous $SiO_2$ thin-film having a three-dimensional structure, which includes obtaining an organo-inorgano composite $SiO_2$ thin-film having a three-dimensional structure formed on the base material by mixing an alkylene oxide block copolymer and a tetraalkyl orthosilicate in an ethanol solution, effecting hydrolysis with adjusting the solution to a low pH region to form a sol solution, dropping the sol solution onto a substrate, rotating the substrate at a high speed, and evaporating the solvent to effect gelation; and subsequently sintering the thin-film (Patent Document 6) and the like process.

Since ordered mesoporous silica is regularly deposited, i.e., homogeneous pore channels are directed to a transverse direction in this kind of mesoporous material, in the case where such a mesoporous material is used for an insulating layer (low-k material) of a highly integrated electronic circuit, a stress is to be applied from a lateral side of the fine pore channels, i.e., from above during a processing step. This kind of the mesoporous material having a honeycomb structure is weak in mechanical strength of the lateral side of the fine pore channels. Therefore, a conventional mesoporous film is apt to be broken at the fine pores during the above processing step. Moreover, in the case of using the conventional mesoporous film as a separating film, since substances are permeated through inside of the fine pores and separated, the mesoporous material where the homogeneous pore channels are directed to a transverse direction cannot virtually be utilized as a separating film. This is also true in the case where it is utilized as a chemical sensor. Furthermore, in the case of using the mesoporous material as a high-density recording medium, it becomes possible to utilize it as a high-density recording medium only when individual fine pores act as recording units. Therefore, when the fine pore channels are directed to a transverse direction, reading and writing are difficult and effective surface area participating in recording is small, so that effects are difficult to be exhibited. From the above, in order to effectively apply the mesoporous body, it is desired to develop a material where the mesopore channels having homogeneous pores pierced vertically are regularly arranged. There is known a polysilicate salt having a structure where a silicate sheet having a six-membered ring is vertically arranged (Patent Document 7).

Moreover, there is known a process wherein (A) an anionic surfactant, (B) a silicate monomer, and (C) a basic silane are mixed in water or a mixed solvent of water and an organic solvent miscible therewith to obtain a mesoporous silica composite having homogeneously sized mesopores; the mesoporous silica composite is washed with an acidic aqueous solution or an organic solvent miscible with water or an aqueous solution thereof to remove the anionic surfactant of the component (A), thereby obtaining a mesoporous silica outer shell having the structure of the mesoporous silica composite as a template; and the mesoporous silica composite or the mesoporous silica outer shell is calcined (Patent Document 8).

However, the conventionally known mesoporous silica film is limited to a μm-order thin-film and no thick-film has been produced yet.

For obtaining a mesoporous silica thick-film, although it may be considered that the film thickness may be adjusted by a direct dip coating method or the like onto a substrate, actually, the film cannot be formed in an arranged state having a regular structure, so that it becomes difficult to form a thick-film.

If a thick-film is obtained as compared with the conventional thin-films, mesoporous silica is expected to be as an adsorbent for water and organic vapors owing to its homogeneous and ordered mesopore structure. For example, in the case where it is considered as a water vapor adsorbent, since it exhibits a large adsorption and desorption amount in a specific narrow relative humidity range depending on a mesopore diameter and the adsorption is attributable to capillary condensation, it has a large potential as a novel adsorbent (moisture absorbent) which requires small energy for regeneration, requires low temperature for regeneration, and has a large adsorption amount. Owing to the adsorbing properties, it becomes possible to obtain a film which allows development of an air-cleaning system having excellent properties which are not exhibited by conventionally often employed zeolites and silica gel.

Thus, development of a mesoporous silica thick-film has been highly desired.

Patent Document 1: WO91/11390
Patent Document 2: JP-A-2002-338229
Patent Document 3: JP-A-2004-27270
Patent Document 4: JP-A-2002-250713
Patent Document 5: Japanese Patent Application No. 2003-385662
Patent Document 6: JP-A-2002-250713
Patent Document 7: JP-A-2003-335516
Patent Document 8: JP-A-2004-345895
Non-Patent Document 1: Nature. Vol. 359, p. 710
Non-Patent Document 2: Journal of Chemical Society Communications. Vol. 1993, p. 680
Non-Patent Document 3: J. Am. Chem. Soc. 11410834 (1992)
Non-Patent Document 4: Chemical Communications. Vol. 1996, p. 1149
Non-Patent Document 5: Nature. Vol. 389, p. 364
Non-Patent Document 6: Nature. Vol. 379, p. 703

DISCLOSURE OF THE INVENTION

Problems that the Invention is to Solve

An object of the invention is to provide a thick-film mesoporous silica and a process for producing a thick-film mesoporous silica.

Means for Solving the Problems

The mesoporous silica powder is dispersed in a solvent. The mesoporous silica is necessarily dispersed homogenously and is desirably in the form of a fine powder (particle diameter: 40 μm or less). Electrode plates are placed in the dispersion of the mesoporous silica in the solvent and voltage in a range of from a finite value of 0 V or more to 1000 V is applied. In the solvent, the mesoporous silica is charged positive or negative, is migrated toward the anode electrode, and can be precipitated in an arranged state having a regular structure on the electrode surface. An amount of electrophoretic deposition increases depending on the passage of time within a specific period of time. When the time zone is passed, the amount of electrophoretic deposition becomes constant. The relation between the amount of electrophoretic deposition per unit and electrophoretic deposition time also progresses similarly. Moreover, the electrophoretic deposition time and the electrophoretic deposition thick-film also progress similarly.

Based on the results measured beforehand, an electrophoretic deposited film having a desired thickness up to about 1 mm can be produced by controlling the voltage and the electrophoretic deposition time.

Thus, a thick-film can be formed on a surface of the electrode plate in a state that a mesoporous silica is arranged as a regular structure by subjecting the mesoporous silica to electrophoretic deposition. Furthermore, it has been found that a 1 mm-order thick-film can be finally formed and fixed when the thick-film is treated at a temperature of 150 to 500° C.

According to the present invention, the followings are provided.

(1) A mesoporous silica thick-film comprising a layer of mesoporous silica formed in a thickness of 10 μm to 1 mm.

(2) The mesoporous silica thick-film according to (1) above, wherein the mesoporous silica is arranged as a regular structure by electrophoretic deposition thereby being formed in a thickness of 10 μm to 1 mm.

(3) The mesoporous silica thick-film according to (1) or (2) above, wherein the mesoporous silica is arranged as a regular structure by electrophoretic deposition thereby being form in a thickness of 10 μm to 1 mm, followed by being treated at a temperature of 150 to 500° C.

(4) The mesoporous silica thick-film according to any one of (1) to (3) above, wherein the mesoporous silica has a homogeneous fine pore diameter in a range of 1 to 10 nm.

(5) The mesoporous silica thick-film according to any one of (1) to (4) above, wherein the mesoporous silica thick-film is formed on a surface of a substrate.

(6) A process for producing a mesoporous silica thick-film, which comprises disposing a substrate in a solution containing mesoporous silica suspended therein and subsequently applying a voltage thereby to form a film having a thickness of 10 μm to 1 mm by the electrophoretic deposition of the mesoporous silica on a surface of the substrate.

(7) The process for producing a mesoporous silica thick-film according to (6) above, wherein the mesoporous silica is arranged as a regular structure by the electrophoretic deposition thereby to form the film having a thickness of 10 μm to 1 mm.

(8) The process for producing a mesoporous silica thick-film according to (6) or (7) above, wherein the film having a thickness of 10 μm to 1 mm is formed by the electrophoretic deposition of the mesoporous silica on the surface of the substrate, followed by being treated at a temperature of 150 to 500° C.

(9) The process for producing a mesoporous silica thick-film according to any one of (6) to (8) above, wherein the mesoporous silica has a homogeneous fine pore diameter in a range of 1 to 10 nm.

(10) The process for producing a mesoporous silica thick-film according to any one of (6) to (9) above, wherein the mesoporous silica thick-film is formed on the surface of the substrate.

(11) The process for producing a mesoporous silica thick-film according to any one of (6) to (10) above, wherein the voltage is in a range of from a finite value of 0 V or more to 1000 V.

(12) An adsorbing apparatus comprising said thick-film according to any one of (1) to (5) above.

(13) An adsorbing film comprising said thick-film according to any one of (1) to (5) above.

Advantage of the Invention

According to the invention, there can be obtained a mesoporous silica thick-film which has hitherto been desired.

By utilizing the thick-film, rapid adsorption and desorption of water and organic vapors and various gases become possible.

The adsorption and desorption properties of the mesoporous silica thick-film for vapors and gases are superior to those of mesoporous silica powder itself, so that development of a novel adsorption and desorption apparatus becomes possible and also development of novel cleaning system and concentration system employing the same becomes possible. In addition, it becomes possible to produce a mesoporous silica thick-film having the following advantages as compared with the conventional film-forming processes.

a. By the use of the electrophoretic deposition method, seed crystals can be applied rapidly and homogeneously as compared with the conventional slurry-infiltrating method.

b. By the use of the electrophoretic deposition method, a film thickness to be formed can be precisely controlled by controlling the voltage and the deposition time.

c. By the use of the electrophoretic deposition method, it becomes possible to form a mesoporous silica thick-film on base materials having various shapes.

d. By the use of the electrophoretic deposition method, it becomes possible to reduce the amount of a binder contained in the thick-film or to cancel the binder.

e. It is effective for mass production and cost saving.

DESCRIPTION OF REFERENCE NUMERALS AND SIGNS IN FIG. 2

1 tubular stainless substrate
2 electrophoretic deposition bath
3 counter electrode
4 messcylinder
5 direct current voltmeter

BEST MODE FOR CARRYING OUT THE INVENTION

The mesoporous silica thick-film of the invention is a film formed of mesoporous silica in a thickness of 10 μm to 1 mm. The mesoporous silica may be any one having a hexagonal structure shown in FIG. 1, a cubic structure, or the like so long as it has a homogeneous mesopore diameter in a range of 1 to 10 nm.

The mesoporous silica thick-film is composed by arranging the mesoporous silica as a regular structure by electrophoretic deposition.

The mesoporous silica thick-film is a mesoporous silica thick-film formed on a surface of a substrate.

The substrate is formed of a conductive substance and is suitably adopted so long as it can be used as an electrode. Examples of the substrate include metal materials such as stainless steel, ordinary steel, low alloy steel, Al, and Cu, and non-metallic materials such as ceramics, glass, and pottery and porcelain. In the case where an insulating material exhibiting no conductivity is used as a base material, conductivity can be imparted by electroless plating of Ni, Cu, or the like or by coating a conductive ceramic such as ITO prior to the electrophoretic deposition.

The substrate may be a plate shape or any other distorted shape such as tubular or prismatic one. Since a thick-film is formed on the substrate surface, in the case of using it with installation into an apparatus, a member constituting the apparatus can be used as the substrate. In the case that the substrate is distorted one such as tubular or prismatic one, the thick-film can be formed along the shape.

Figure 1:
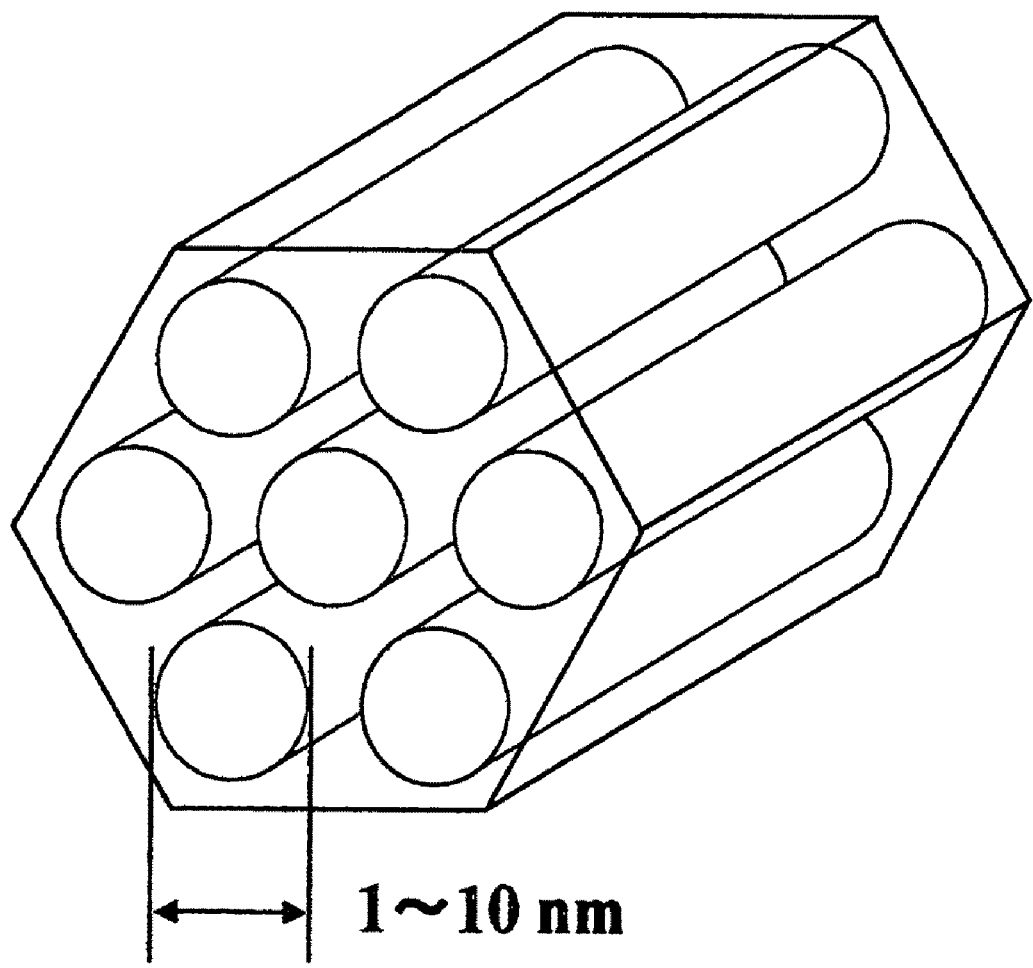
FIG. 1 is a figure showing a structure of mesoporous silica.

The mesoporous silica for use in the formation of the thick-film of the invention has a homogeneous fine pore diameter in a range of 1 to 10 nm and may be any one such as those having the shape shown in FIG. 1, a cubic structure or the like. For the production of the mesoporous silica, for example, it can be synthesized by the spray-drying method shown below.

According to this method, a fine powdery mesoporous silica having a diameter of 10 μm or less can be synthesized. In this connection, for the electrophoretic deposition, it is necessary to homogeneously disperse mesoporous silica into an electrophoretic deposition bath. For the purpose, the mesoporous silica is desirably in a fine powdery shape (particle diameter: 40 μm or less). Therefore, according to the spray-drying method, a homogeneously dispersed mesoporous silica suspension can be obtained.

Moreover, as another method, there may be used mesoporous silica having a particle diameter of 40 μm or less, which is obtained by pulverizing or classifying mesoporous silica synthesized by hydrothermal synthesis or solvent evaporation.

The spray-drying method is as follows.

An organic solvent is poured into a reaction vessel and is stirred.

A silicate compound is added thereto and the whole is stirred in the presence of an acid and a surfactant to achieve hydrolysis. As the silicate compound of the starting material, an alkyl silicate, an alkoxy silicate, or the like can be employed. The acid is not limited to a particular acid. Owing to easy handling and availability, an aqueous hydrochloric acid solution can be added and used. As the surfactant, a cationic or nonionic surfactant can be used.

The treating temperature may be an ordinary temperature. Thus, a hydrolyzate solution of the silicate compound can be obtained. The solution is sprayed by means of a spray dryer to evaporate the solvent, thereby obtaining a white powder.

The resulting white powder is calcined to remove the template (the cationic or nonionic surfactant). The calcination temperature is suitably determined. In general, it is 500 to 700° C. Thus, a mesoporous silica having a three-dimensional regularity having a homogeneous fine pore diameter ranging from 1 to 10 nm can be obtained.

The following will describe the step for the electrophoretic deposition.

Figure 2:
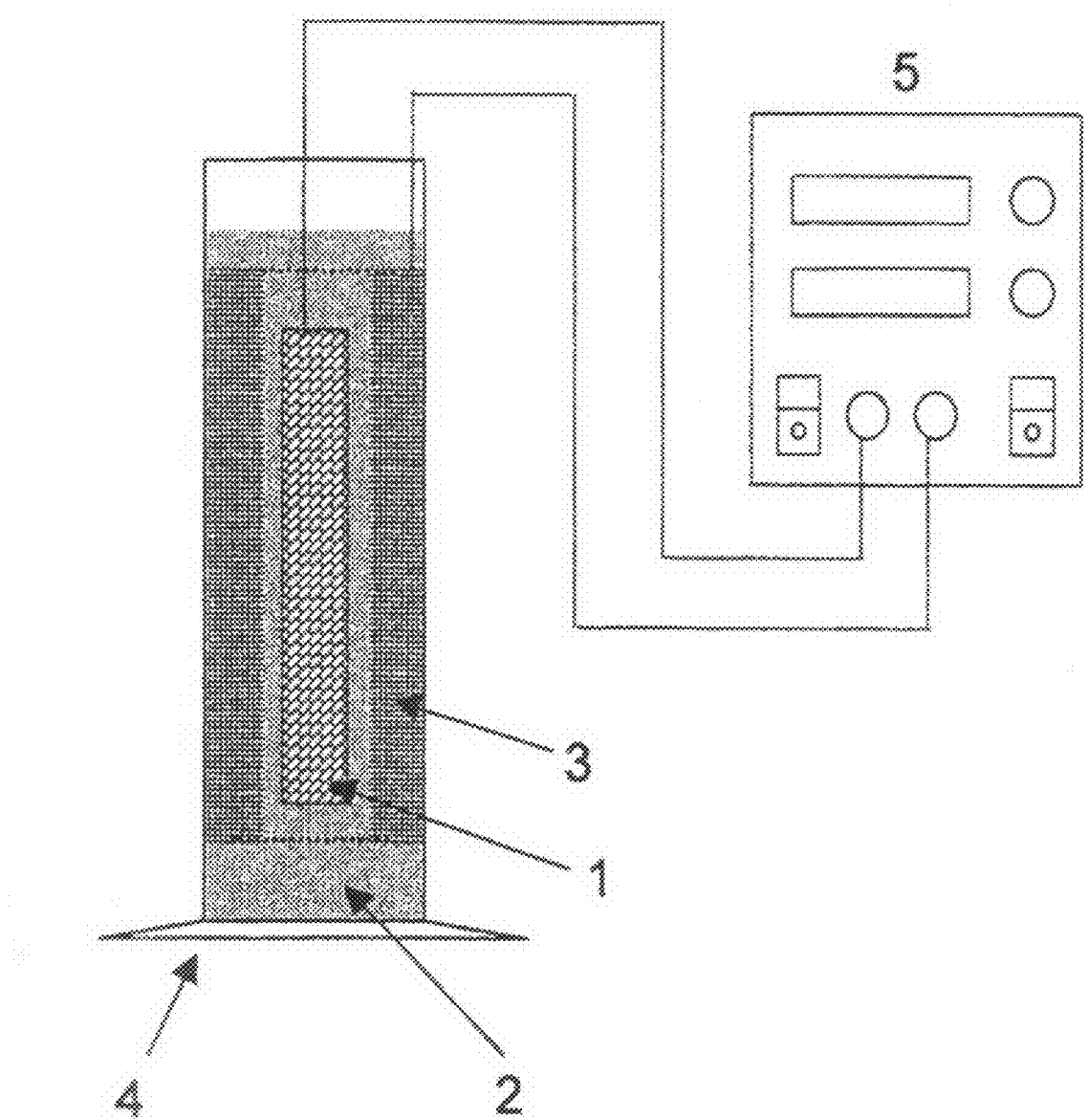
FIG. 2 is a figure showing a electrophoretic deposition apparatus.

FIG. 2 is a figure showing an apparatus for the electrophoretic deposition for use in the invention.

A solvent is charged into the apparatus for the electrophoretic deposition in the vessel of a messcylinder 4 and the mesoporous silica obtained in the above step of producing the mesoporous silica is dipersed therein. As the solvent, water or an organic solvent may be suitably used. In this connection, as the organic solvent, an alcohol a ketone such as acetone, hexane, or the like can be used.

In the course of the treatment, stirring with a stirrer or the like can be applied but application of ultrasonic vibration is more preferred. The reason is that the vibration may exhibit an effect of preventing overlap of mesoporous silica themselves and enhancing orientation of the mesoporous silica. In the case of applying the untrasonic vibration, it is sufficient to use a commonly commercially available ultrasonic cleaner, and specifically, an output of 30 W or more or 20 kHz or more is sufficient.

The charging behavior of the mesoporous silica powder in a solvent varies depending on the kind of the solvent and the process for producing the mesoporous silica powder and the powder may be charged positive or negative. In acetone, since the mesoporous silica powder is charged negative, the substrate is used as an anode and a stainless net is used as a counter electrode. These electrodes are disposed. A known electrode can be used accordingly.

By applying voltage for a certain period of time, the mesoporous silica powder can be electrophoresis on the surface of a tubular stainless substrate 1. Particularly, in the case of using a mesoporous silica/acetone-based electrophoretic deposition bath 2, a fine thick-film of the mesoporous silica can be formed. The voltage varies depending on the ability of the apparatus for the electrophoretic deposition. As the voltage by means of a direct current voltmeter 5, a value in the range of from a finite value of 0 V or more to 1000 V is adopted.

The term "range of from a finite value of 0 V or more to 1000 V" means that it is essential to apply voltage in the electrophoretic deposition in the invention. Specifically, since the electrophoretic deposition cannot be achieved when the value of the voltage on that occasion is 0 V, it means that the range does not include voltage 0 and the voltage may be a value exceeding 0 V, for example, 0.01, 0.1, 1, or 100 V. In conclusion, it means that the invention is practicable when the voltage having a value exceeding 0 V and up to 1000 V is applied.

Figure 3:
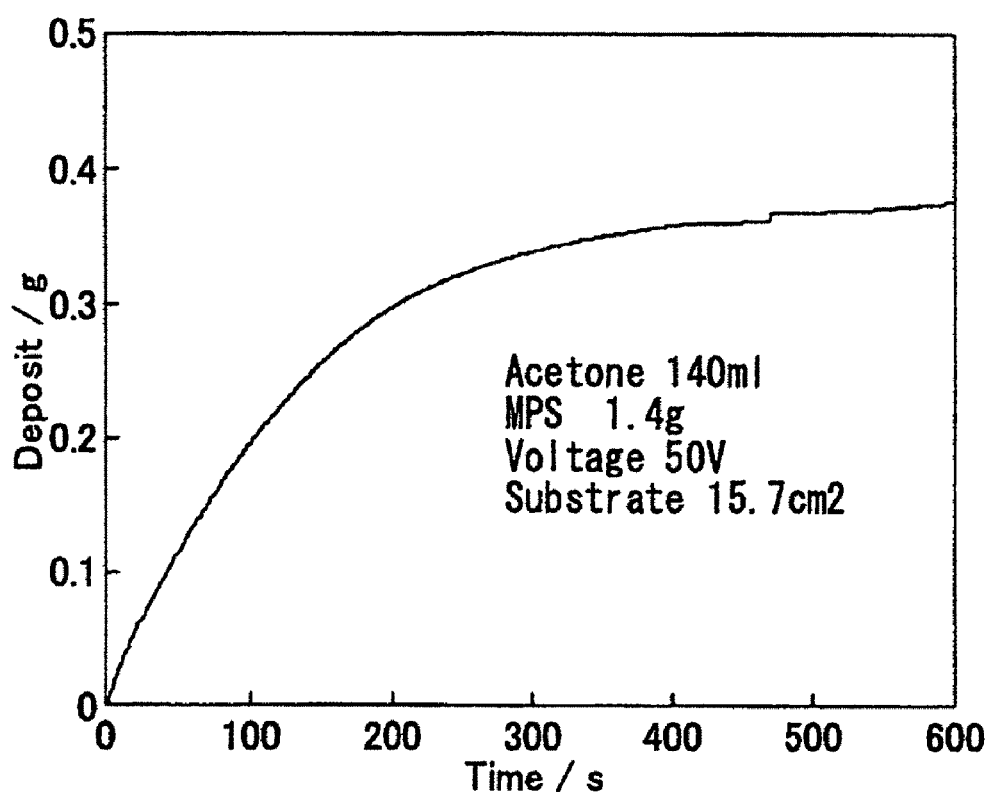
FIG. 3 is a figure showing a relation between electrophoretic deposition time and the amount of electrophoretic deposition in the electrophoretic deposition of mesoporous silica from a mesoporous silica/acetone-based electrophoretic deposition bath.
Figure 5:
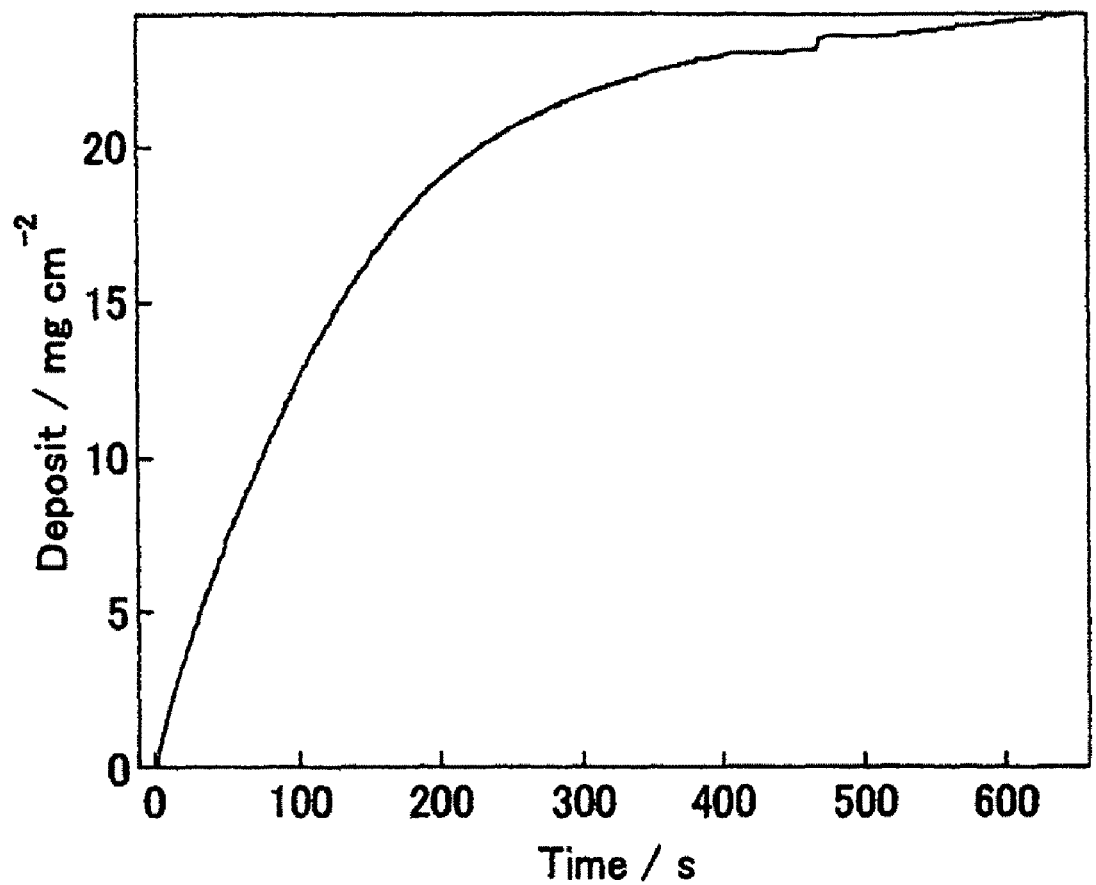
FIG. 5 is a figure showing a relation between electrophoretic deposition time and the amount of electrophoretic deposition per unit area.
Figure 6:
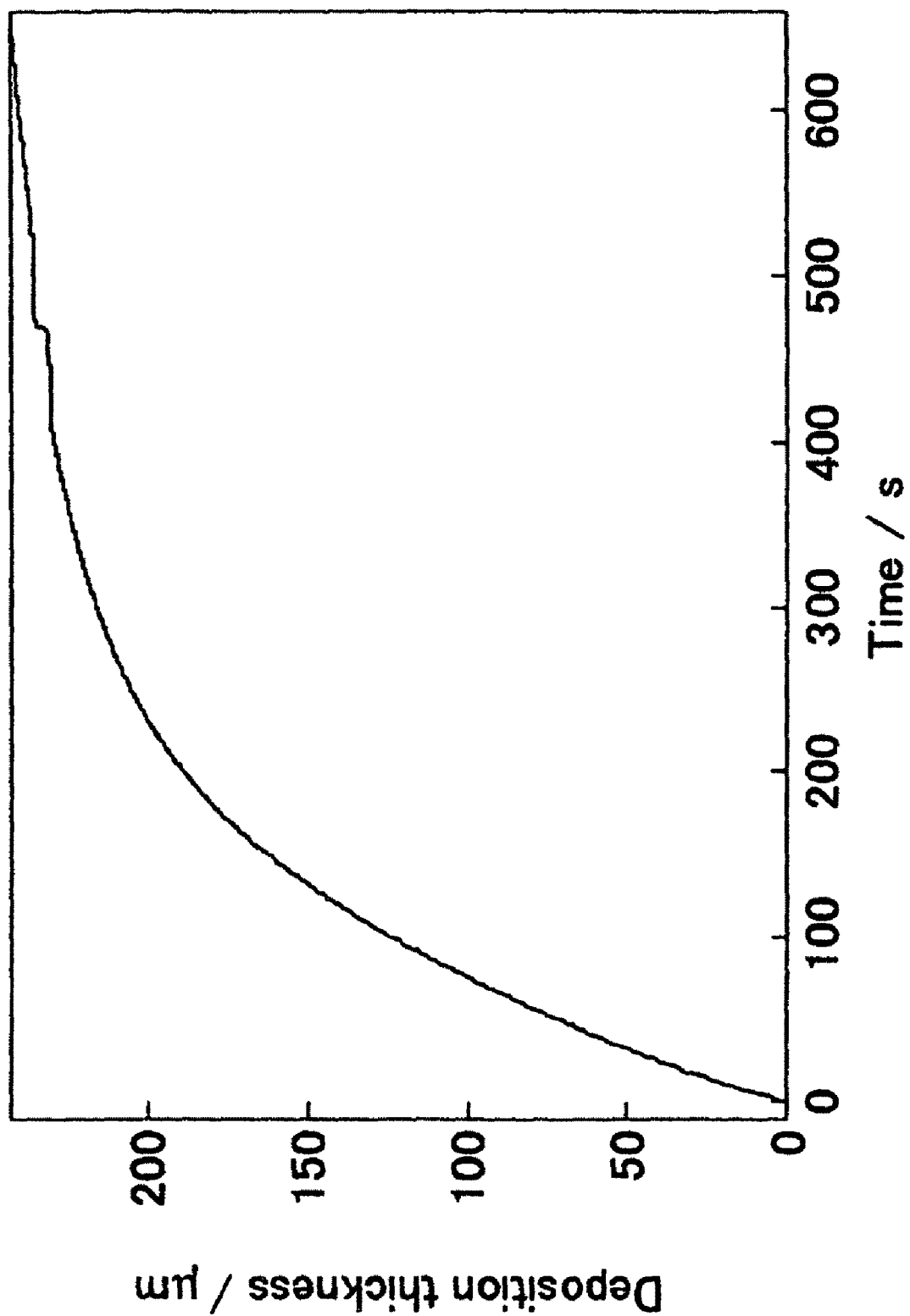
FIG. 6 shows a relation between electrophoretic deposition time and electrophoretic deposited film thickness.

The amount of electrophoretic deposition increases depending on the passage of time within a specific period of time. When the specific period of time is passed, the increase in the amount of electrophoretic deposition disappears, and the amount of electrophoretic deposition takes a constant value (FIG. 3). The relation between the amount of electrophoretic deposition per unit and the electrophoretic deposition time progresses similarly (FIG. 5). Moreover, the electrophoretic deposition time and the electrophoretic deposited thick-film also progress similarly (FIG. 6).

Based on such results measured beforehand, voltage is applied until desired electrophoretic deposited thick-film and the amount of electrophoretic deposition are obtained.

Figure 7:
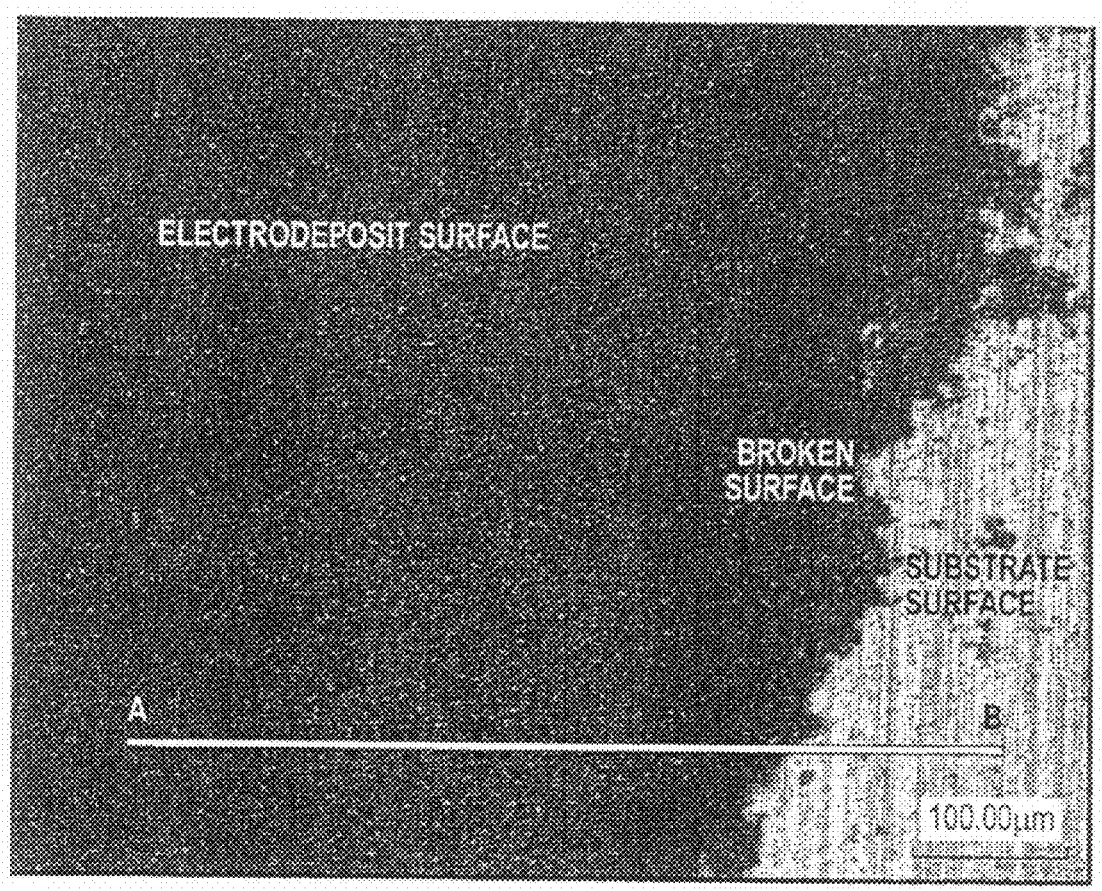
FIG. 7 is a figure showing a surface microscopic photograph of electrophoretic deposited film.
Figure 8:
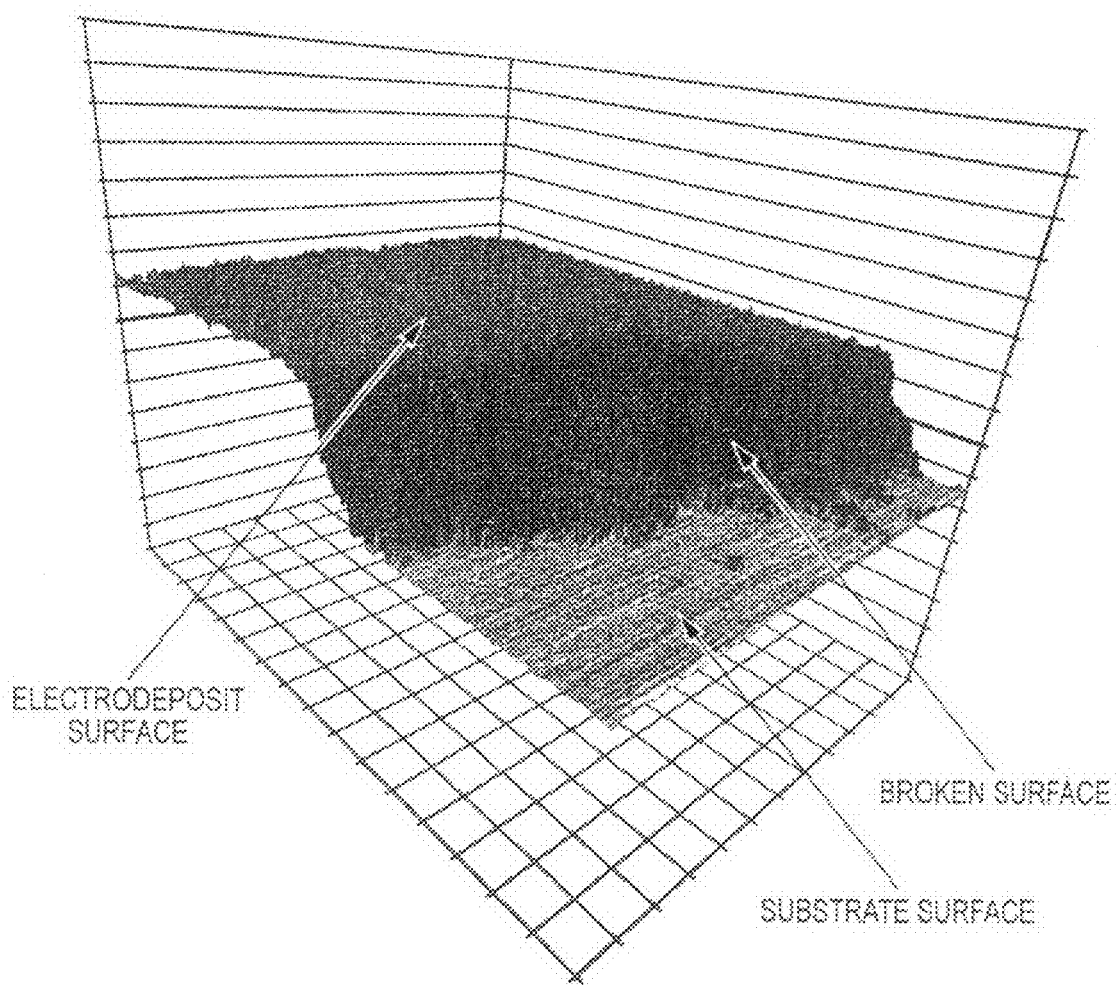
FIG. 8 is a surface 3D image of electrophoretic deposited film.
Figure 9:
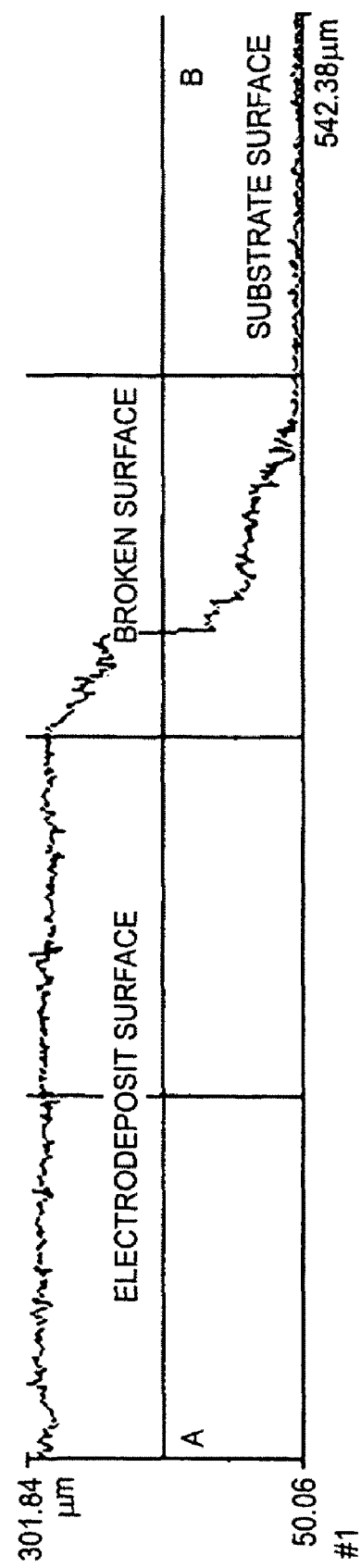
FIG. 9 is a figure showing a result of height distribution measurement of electrophoretic deposited film.

The mesoporous silica thick-film formed on the substrate, which is obtained in the above step, is taken out and the solvent attached is removed by treating it at 150 to 500° C., whereby a mesoporous silica thick-film composed of a dense film can be formed. The structure is shown in FIG. 7, FIG. 8, and FIG. 9. When the thick-film is treated at a temperature exceeding 500° C., there is a risk that the shape thereof is broken. Moreover, when the temperature is lower than 150° C., a sufficient heat treatment is not performed in some cases and as a result, formation of the dense film is inhibited.

By subjecting the resulting mesoporous silica thick-film to X-ray diffraction analysis (XRD) of mesoporous silica, it can be confirmed that the mesoporous silica in the thick-film has a high three-dimensional regularity.

Moreover, by subjecting the mesoporous silica thick-film to a test whether it has a gas adsorbing ability or not, the gas adsorbing ability can be investigated.

Figure 10:
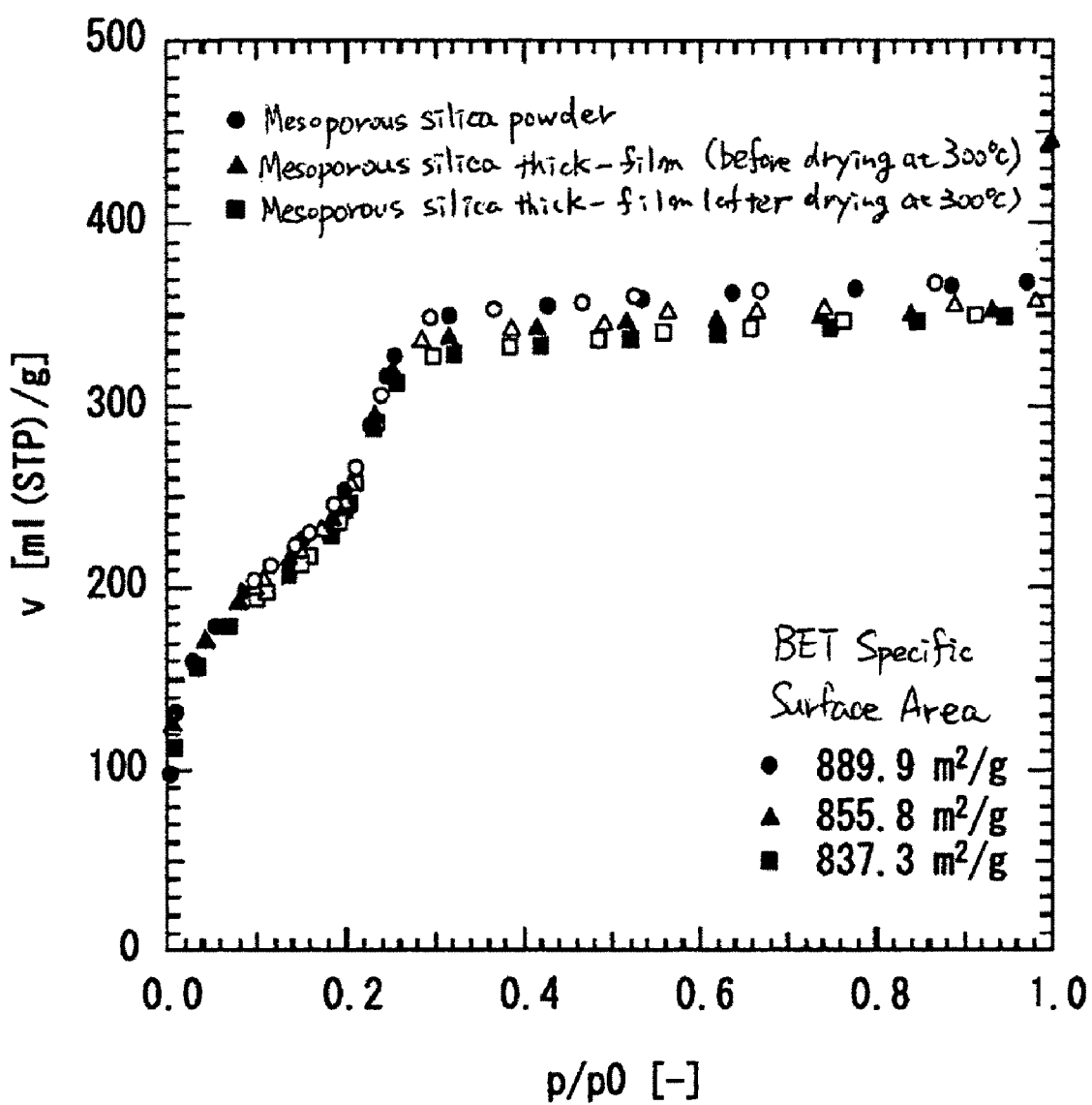
FIG. 10 is a figure showing a result of nitrogen adsorption evaluation.

The fine pore structure of the resulting mesoporous silica thick-film is evaluated using a nitrogen-adsorption measuring apparatus (Belsorp-mini, manufactured by Bel Japan, Inc.). The results are as shown in FIG. 10. The nitrogen-adsorption isotherms of the mesoporous silica powder, a mesoporous silica thick-film formed on a stainless substrate by electrophoretic deposition (EPD), and a mesoporous silica thick-film after heat treatment at 300° C. all exhibit IV-type isothermal curves (according to the classification of IUPAC) characteristic to porous materials having mesopores, and it is found that an original highly regular fine pore structure is maintained even after EPD and heat treatment.

Based on the results, the mesoporous silica obtained in the invention is found to have an adsorbing ability of steam and organic vapors owing to the homogeneous and regular fine pore structure. Specifically, in the case where it is considered as a water vapor adsorbent, since it exhibits a large adsorption and desorption amount in a specific narrow relative humidity range depending on the homogeneous pore diameter and the adsorption is attributable to capillary condensation, it has a large potential as a novel adsorbent (moisture absorbent) which requires a small energy for regeneration, is capable of regeneration at low temperature, and has a large adsorption amount. Owing to the adsorption properties, it becomes possible to use the mesoporous silica in an air-cleaning system having excellent properties which are not exhibited by conventionally employed zeolites and silica gel, as well as air-cleaning facilities for various production lines. Furthermore, it is possible to utilize it in an apparatus for concentrating a dilute gas by adsorption treatment.

The following will describe the content of the invention with reference to Examples. The invention is not limited thereto.

EXAMPLE 1

(1) Synthesis of Mesoporous Silica

Into 200 ml of a glass beaker were charged 9.6 g of cetyltrimethylammonium chloride and 69 g of ethanol, followed by stirring by means of a magnetic stirrer. When it was dissolved, 31.2 g of tetraethyl orthosilicate and 27 g of an aqueous hydrochloric acid solution ($1 \times 10^{-3}$ M) were added thereto and the whole was stirred at ordinary temperature for 1 hour to obtain a transparent hydrolyzate solution.

The hydrolyzate solution was transferred into a 500 ml of an round-bottom flask and was reacted at a temperature of 25° C. in a reduced pressure state of 70 hPa for 1 hour and 24 minutes using a rotary evaporator (38 rpm).

Thereafter, the solution was sprayed to remove the solvent by means of a spray dryer (GS310, manufactured by Yamato Science Co., Ltd.), thereby a white powder being obtained. The conditions at that time were as follows: diameter of spraying nozzle: 0.7 mmφ, liquid-transfer rate: 4.4 g/min, inlet temperature of spray: 80° C., spraying pressure: 0.075 MPa, and spraying airflow: 0.5 m³/min.

Figure 11:
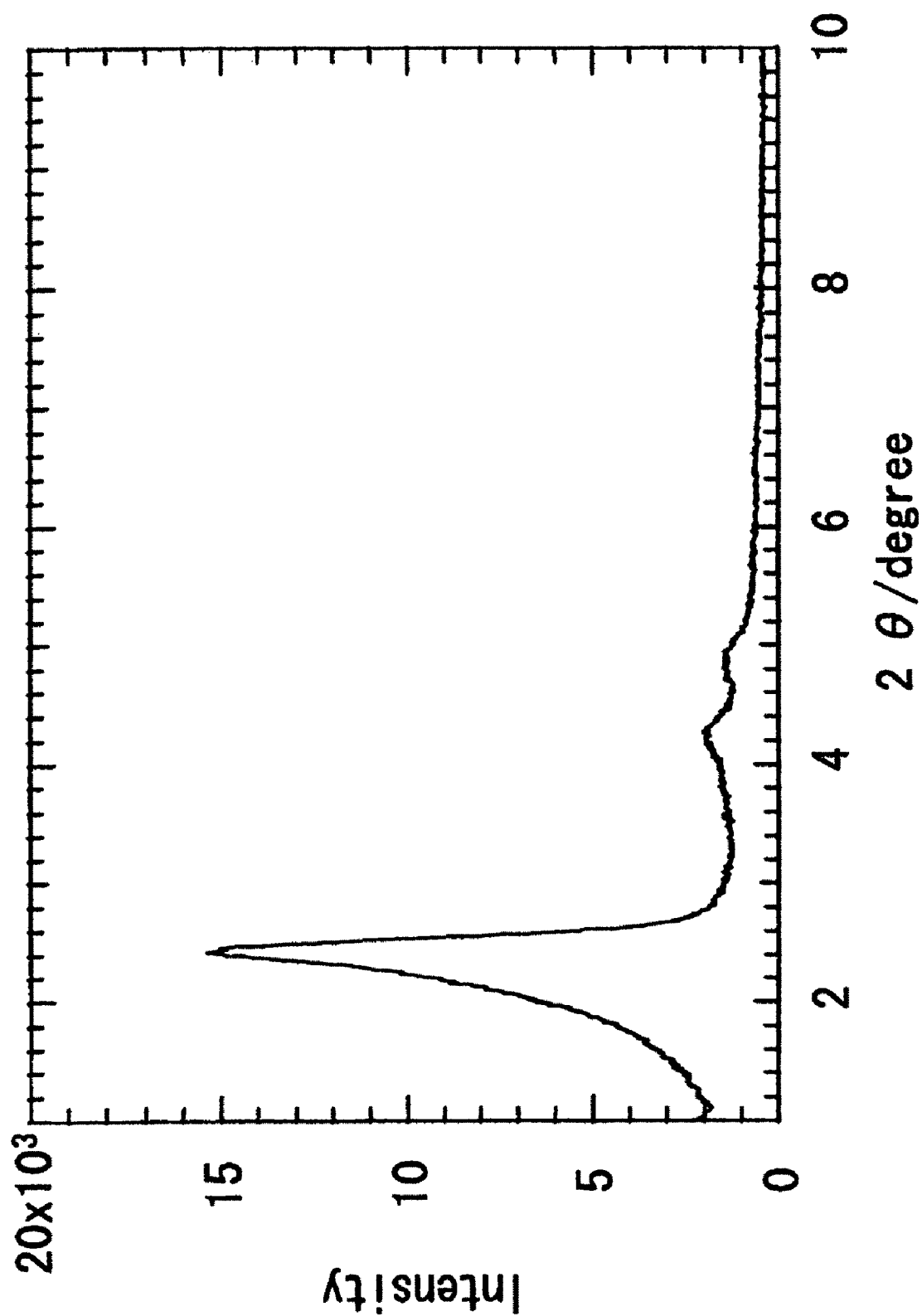
FIG. 11 is a figure showing an X-ray diffraction pattern of mesoporous silica powder.

The resulting white powder was calcined at 600° C. to remove the cationic or nonionic surfactant. When the structural regularity of the porous structure was evaluated by X-ray diffraction analysis (XRD) (FIG. 11) of the resulting mesoporous silica and adsorption isothermal curve with nitrogen gas, the resulting mesoporous silica had a high three-dimensional regularity.

(2) Preparation of Mesoporous Silica Thick-film

As a preliminary experiment, the mesoporous silica powder obtained by the above synthetic process was added to water or an organic solvent in a ratio of 0.1 g per 30 ml of the medium and the whole was irradiated with ultrasonic wave for 10 minutes, thereby a electrophoretic deposition bath being obtained. The particle size of the mesoporous silica used in the preliminary experiment was 10 µm or less in the electrophoretic deposition bath. However, a particle size of 40 µm or less may be sufficient. As the organic solvent, an alcohol such as methanol, ethanol, or 1-propanol, a ketone such as acetone, and hexane was used. The apparatus for electrophoretic deposition is shown in FIG. 2. Experimental results obtained when various solvents were used as electrophoretic deposition baths using the apparatus are shown in Table 1. With regard to the charge of the mesoporous silica important at the time when electrophoretic deposition was performed, from Table 1, it was found that the mesoporous silica added to any solvents exhibited a strong tendency to be positively charged. From the results, in the case of utilizing the electrophoretic deposition method, it was revealed that the mesoporous silica powder electrically migrates toward an anode. Accordingly, by using a tubular stainless substrate as an anode and a stainless net as a counter electrode and applying voltage of 50 V for 3 minutes, the mesoporous silica powder is electrophoresis and the mesoporous silica powder was applied on the surface of the tubular stainless substrate. Particularly, in a mesoporous silica/acetone-based electrophoretic deposition bath, a good thick-film of the mesoporous silica could be formed.

Figure 4:
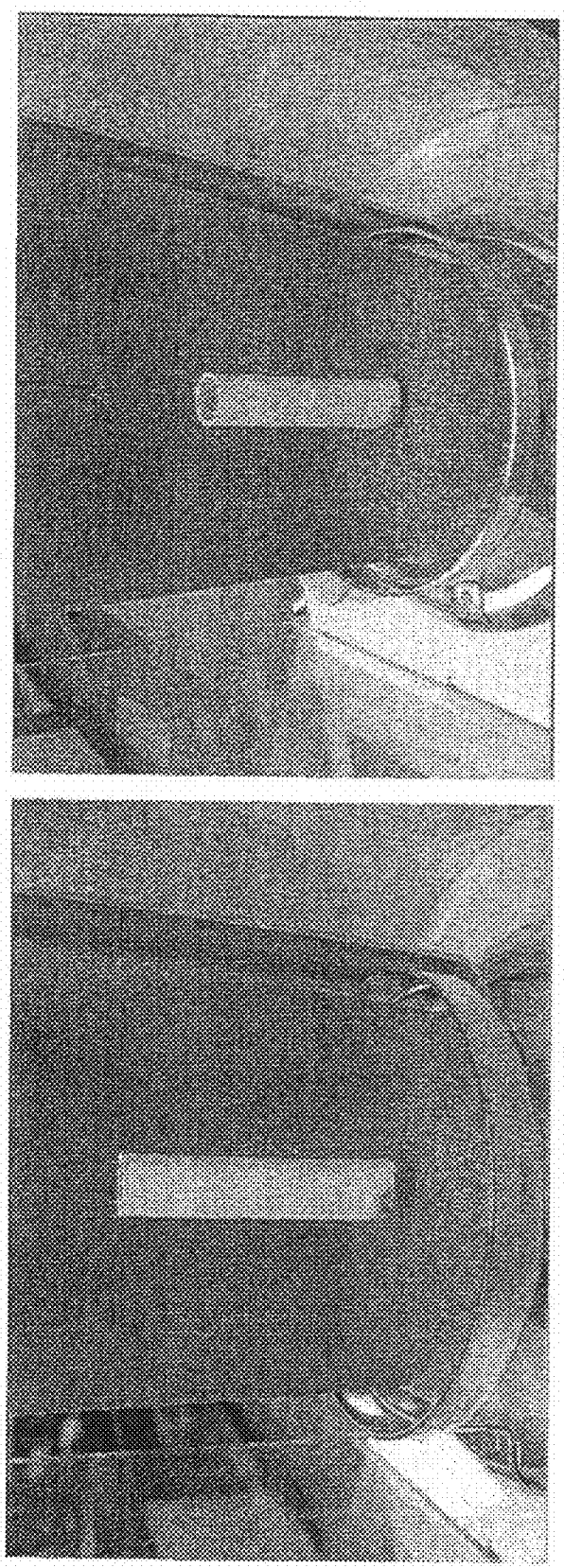
FIG. 4 is a figure showing an electrophoretic deposition.

Then, as a real experiment, using the experimental apparatus shown in FIG. 2, when 1.4 g of mesoporous silica was added to 140 ml of acetone and an electrophoretic deposition experiment was performed at 50 V using a tubular stainless substrate having a surface area (right side) of 15.7 cm² as an anode substrate, the amount of electrophoretic deposition of the mesoporous silica increased with the electrophoretic deposition time and a film could be formed on the stainless tube in an amount of about 0.4 g over a period of 10 minutes (FIG. 3). A photograph of the sample is shown in FIG. 4. Visually, it was found that a homogeneous thick-film could be formed. It was revealed that the amount of electrophoretic deposition per unit area of the substrate reached about 24 mg/cm$^2$ within 10 minutes of electrophoretic deposition time (FIG. 5) and a thick-film having a film thickness of up to about 240 μm could be formed (FIG. 6). The amount of electrophoretic deposition increases depending on the passage of time within a certain specific period of time. When the time zone is passed, the amount of electrophoretic deposition becomes constant. The relation between the amount of electrophoretic deposition per unit and electrophoretic deposition time also progresses similarly. Moreover, the electrophoretic deposition time and the electrophoretic deposited thick-film also progress similarly.

Based on the results measured beforehand, voltage is applied until a desired electrophoretic deposited thick-film and the amount of electrophoretic deposition are obtained.

oblique direction, a mesoporous silica-deposited layer having a homogeneous thickness was formed (FIG. 8). Also from height distribution measurement at a line A to B in FIG. 7, it was found that the electrophoretic deposition was deposited smoothly in a thickness of about 240 μm onto the substrate (FIG. 9).

(5) Evaluation of Fine Pore Structure

The fine pore structure of the resulting film was evaluated using a nitrogen-adsorption measuring apparatus (Belsorp-mini, manufactured by Bel Japan, Inc.). The results are shown in FIG. 10. The nitrogen-adsorption isothermal curves of the mesoporous silica powder, the mesoporous silica thick-film formed on a stainless substrate by EPD, and the mesoporous silica thick-film after heat treatment at 300° C. all exhibited IV-type isothermal curves (according to the classification of IUPAC) characteristic to porous bodies having mesopores and it was found that an original highly regular fine pore structure was maintained even after EPD and heat treatment.

TABLE 1

Electrophoretic deposition conditions and polarity and amount of electrophoretic deposition

| Solvent | Amount of solvent | Kind of powder | Amount of powder | Voltage | Time | Polarity | Weight before electrophoretic deposition (g) | Weight after electrophoretic deposition (g) | Amount of Electrophoretic deposition (g) | Amount of Electrophoretic deposition per unit area g/cm$^2$ |
|---|---|---|---|---|---|---|---|---|---|---|
| MeOH | 30 ml | Calcined powder | 0.105 g | 50 V | 3 min | + | 0.34029 | 0.34029 | 0 | 0.000000 |
|  |  |  |  |  |  | − | 0.35316 | 0.35326 | 0.0001 | 0.000006 |
| EtOH | 30 ml | Calcined powder | 0.0981 g | 50 V | 3 min | + | 0.35077 | 0.35077 | 0 | 0.000000 |
|  |  |  |  |  |  | − | 0.33802 | 0.33807 | 5E−05 | 0.000003 |
| 1-PrOH | 30 ml | Calcined powder | 0.0989 g | 50 V | 3 min | + | 0.34912 | 0.34937 | 0.00025 | 0.000016 |
|  |  |  |  |  |  | − | 0.34343 | 0.34361 | 0.00018 | 0.000011 |
| 2-PrOH | 30 ml | Calcined powder | 0.1056 g | 50 V | 3 min | + | 0.33008 | 0.33016 | 8E−05 | 0.000005 |
|  |  |  |  |  |  | − | 0.34852 | 0.34867 | 0.00015 | 0.000010 |
| Acetone | 30 ml | Calcined powder | 0.0973 g | 50 V | 3 min | + | 0.33294 | 0.35245 | 0.01951 | 0.001243 |
|  |  |  |  |  |  | − | 0.33954 | 0.34038 | 0.00084 | 0.000054 |
| Acetone | 30 ml | uncalcined powder | 0.1002 g | 50 V | 3 min | + | 0.33184 | 0.33357 | 0.00173 | 0.000110 |
|  |  |  |  |  |  | − | 0.35023 | 0.35031 | 8E−05 | 0.000005 |
| Acetone | 30 ml | spray-dried powder | 0.1048 g | 50 V | 3 min | + | 0.33126 | 0.33563 | 0.00437 | 0.000278 |
|  |  |  |  |  |  | − | 0.33551 | 0.3371 | 0.00159 | 0.000101 |
| Hexane | 30 ml | calcined powder | 0.1003 g | 50 V | 3 min | + | 0.33591 | 0.33603 | 0.00012 | 0.000008 |
|  |  |  |  |  |  | − | 0.35020 | 0.35051 | 0.00031 | 0.00002 |
| H$_2$O | 30 ml | calcined powder | 0.0996 g | 2.5 V | 10 min | + | 0.35021 | 0.35031 | 0.00010 | 0.000006 |
|  |  |  |  |  |  | − | 0.33588 | 0.33595 | 0.00007 | 0.000004 |

(3) Charging Properties of Mesoporous Silica Powder

As a result of measurement of electrophoretic mobility and zeta-potential of the mesoporous silica particles in a mesoporous silica/acetone-based bath using a zeta-potential measuring apparatus (Otsuka Electronics ELS-8000), the electrophoretic mobility was found to be about −2.4×10$^{-6}$ cm$^2$/Vs and zeta-potential was found to be about −40 V, so that it was supported that the mesoporous silica was charged negative and was electrically migrated toward the anode when voltage was applied.

(4) Structure of Mesoporous Silica Film

Figure 12:
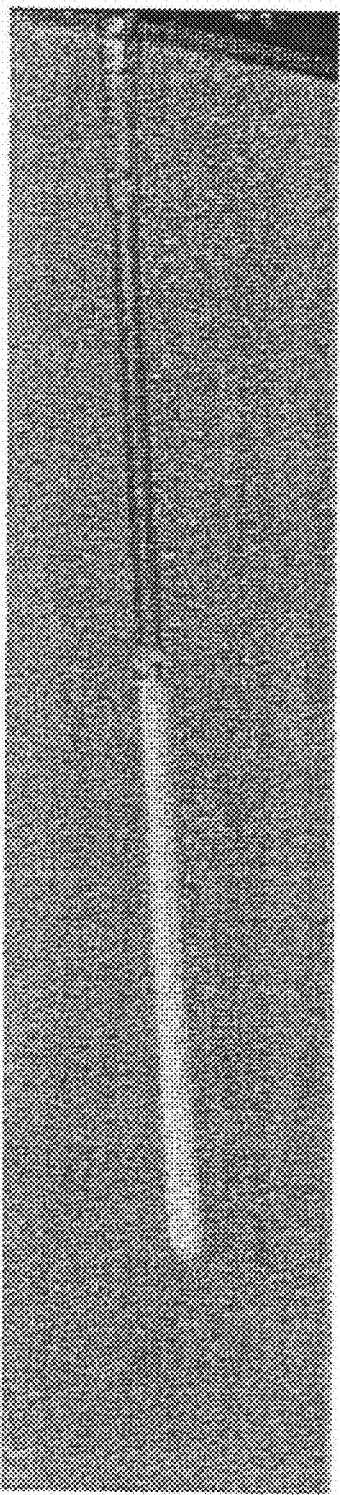
FIG. 12 is a figure showing a mesoporous silica electrophoretic deposited film prepared on a stainless wire (φ0.8 mm).

The surface and the cross-sectional structure of a sample (FIG. 4) which had been obtained by electrophoretic deposition at 50 V for 10 minutes with adding 1.4 g of the mesoporous silica to 140 ml of acetone using a tubular stainless tube having a surface area (right face) of 15.7 cm$^2$ as an anode substrate using an experimental apparatus shown in FIG. 2 were observed on a confocal microscope. When a broken surface where the electrodeposited mesoporous silica film had been partially peeled off was observed from above, the surface of the electrophoretic deposition was smooth (FIG. 7). Moreover, when the broken surface was observed from an (6) Example of Film Formation on Stainless Wire Using the experimental apparatus shown in FIG. 2, 0.1 g of the mesoporous silica was added to 30 ml of acetone and then electrophoretic deposition was performed at 50 V for 3 minutes using a stainless wire having a diameter of 0.8 mm as an anode substrate. As a result, an electrophoretic deposited film having a homogeneous thickness could be applied on the stainless wire (FIG. 12).

(7) Example of Film Formation on Aluminum Plate

Figure 13:
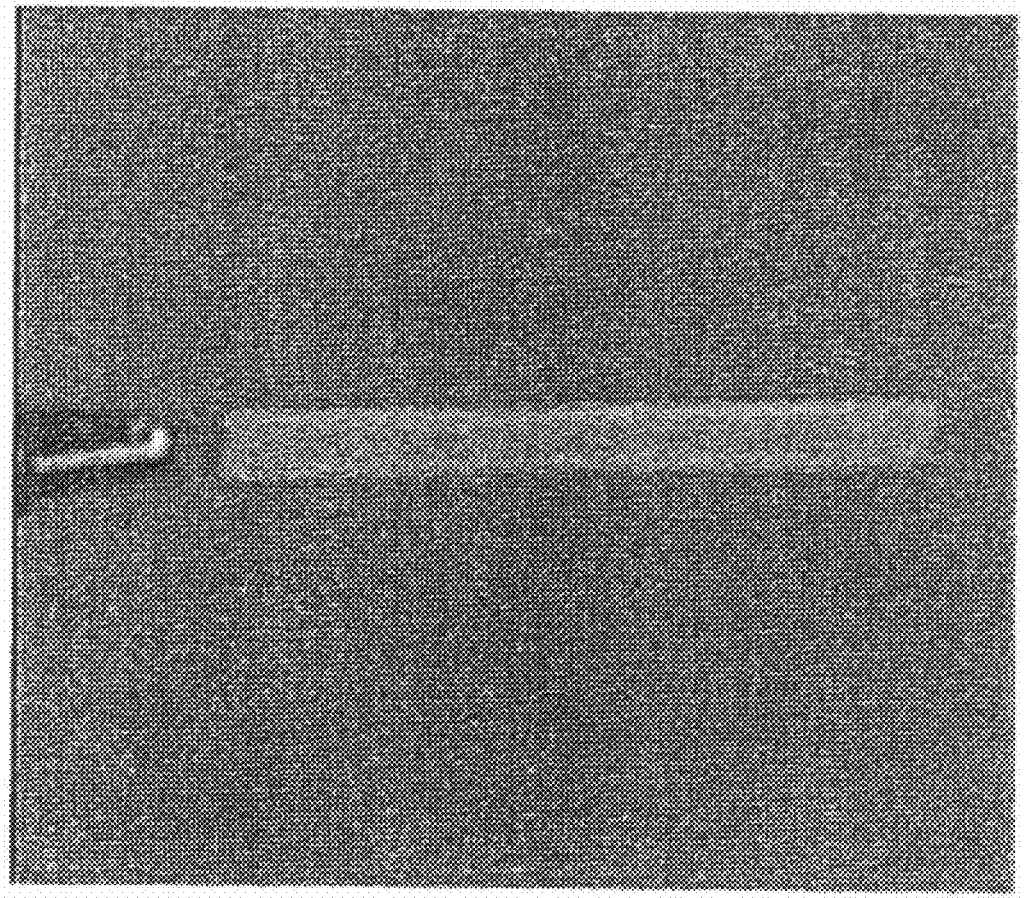
FIG. 13 is a figure showing a mesoporous silica electrophoretic deposited film thinly prepared on an aluminum plate (5 mm×50 mm).

Using the experimental apparatus shown in FIG. 2, 0.23 g of the mesoporous silica was added to 70 ml of acetone and then electrophoretic deposition was performed at 50 V for 10 minutes using an aluminum plate having a width of 5 mm and a length of 50 mm as an anode substrate. As a result, the aluminum plate could be coated with an electrodeposited film having a homogeneous thickness (FIG. 13).

The invention claimed is:

1. A mesoporous silica thick-film comprising a layer of mesoporous silica formed in a thickness of 10 μm to 1 mm, wherein a particle of the mesoporous silica is deposited.

2. The mesoporous silica thick-film according to claim 1, wherein the mesoporous silica is arranged homogeneously electrophoretic deposition thereby being formed in a thickness of 10 μm to 1 mm.

3. The mesoporous silica thick-film according to claim 1, wherein the mesoporous silica is arranged homogeneously by electrophoretic deposition thereby being formed in a thickness of 10 μm to 1 mm, followed by being treated at a temperature of 150 to 500° C.

4. The mesoporous silica thick-film according to any one of claim 1 to 3, wherein the mesoporous silica has a homogeneous fine pore diameter in a range of 1 to 10 nm.

5. The mesoporous silica thick-film according to claim 1, wherein the mesoporous silica thick-film is formed on a surface of a substrate.

6. A process for producing a mesoporous silica thick-film, which comprises disposing a substrate in a solution containing mesoporous silica suspended therein and subsequently applying a voltage thereby to form a film having a thickness of 10 μm to 1 mm by an electrophoretic deposition of the mesoporous silica on a surface of the substrate.

7. The process for producing a mesoporous silica thick-film according to claim 6, wherein the mesoporous silica is arranged homogeneously structure by the electrophoretic deposition thereby to form the film having a thickness of 10 μm to 1 mm.

8. The process for producing a mesoporous silica thick-film according to claim 6, wherein the film having a thickness of 10 μm to 1 mm is formed by the electrophoretic deposition of the mesoporous silica on the surface of the substrate, followed by being treated at a temperature of 150 to 500° C.

9. The process for producing a mesoporous silica thick-film according to claim 6, wherein the mesoporous silica has a homogeneous fine pore diameter in a range of 1 to 10 nm.

10. The process for producing a mesoporous silica thick-film according to claim 6, wherein the mesoporous silica thick-film is formed on the surface of the substrate.

11. The process for producing a mesoporous silica thick-film according to claim 6, wherein the voltage is in a range of from a finite value of 0 V or more to 1000 V.

12. The mesoporous silica thick-film according to claim 2, wherein the mesoporous silica thick-film is formed on a surface of a substrate.

13. The mesoporous silica thick-film according to claim 3, wherein the mesoporous silica thick-film is formed on a surface of a substrate.

14. An adsorbing apparatus comprising said thick-film according to any one of claims 1 to 3, 5, 12, and 13.

15. An adsorbing film comprising said thick-film according to any one of claims 1 to 3, 5, 12, and 13.

16. The mesoporous silica thick-film according to claim 4, wherein the mesoporous silica thick-film is formed on a surface of a substrate.

17. An adsorbing apparatus comprising said thick-film according to claim 4.

18. An adsorbing film comprising said thick-film according to claim 4.

19. An adsorbing apparatus comprising said thick-film according to claim 16.

20. An adsorbing film comprising said thick-film according to claim 16.

* * * * *